United States Patent

O'Neill et al.

[15] 3,648,967
[45] Mar. 14, 1972

[54] TEMPERATURE COMPENSATED HYDRAULIC VALVE

[72] Inventors: Cormac G. O'Neill, Lafayette; Parker C. Smiley, Oakland, both of Calif.

[73] Assignee: Physics International Company, San Leandro, Calif.

[22] Filed: Nov. 10, 1970

[21] Appl. No.: 88,383

[52] U.S. Cl. ...................................251/57, 138/30, 60/51
[51] Int. Cl. ...........................F16k 31/12, F16l 55/04
[58] Field of Search ................138/26, 30; 60/51; 251/57

[56] References Cited

UNITED STATES PATENTS 2,320,866   6/1943   Quiroz ........................251/57 UX
3,415,277   12/1968  Mitchell et al. ...............138/30 X

*Primary Examiner*—Henry T. Klinksiek
*Attorney*—Lindenberg, Freilich & Wasserman

[57] ABSTRACT

A valve of the type which employs a hydraulic piston for amplifying the motion of an actuator, wherein undesirable effects of thermal expansion of the hydraulic fluid are eliminated. The valve includes an elastically expandable chamber coupled through a narrow passageway to the hydraulic cylinder for receiving fluid therefrom at a slow rate to hold the extra volume of hydraulic fluid caused by thermal expansion, and a check valve for allowing fluid to flow quickly from the chamber back to the cylinder. The narrow passageway from the hydraulic cylinder to the expandable chamber is formed by an appreciable clearance between a plunger that is moved by the hydraulic fluid and a plunger cylinder in which it slides.

10 Claims, 2 Drawing Figures

PATENTED MAR 14 1972 3,648,967

INVENTORS
CORMAC G. O'NEILL
PARKER C. SMILEY
BY
Lindenberg, Freilich & Wasserman
ATTORNEYS

TEMPERATURE COMPENSATED HYDRAULIC VALVE

BACKGROUND OF THE INVENTION

1. Field of the Invention

This invention relates to valves and, more particularly, to hydraulically actuated valves.

2. Description of the Prior Art:

One type of valve which is often used in metering devices employs an actuator such as a piezoelectric or mechanical cam type whose limited motion is amplified by a hydraulic piston. The hydraulic piston has a large diameter to pump substantial amounts of fluid along a hydraulic cylinder. A small diameter plunger that operates a valve closing member is moved a large distance by the hydraulic fluid, to obtain a large movement of the valve closing member. When the valve experiences a temperature rise, the hydraulic fluid typically undergoes a greater expansion than the other valve parts, and it may cause a shift in the plunger position which results in the valve closing member remaining slightly open when it should be closed. Conversely, when the valve experiences a temperature drop and the hydraulic fluid contracts, a given movement of the actuator, which should move the valve closing member to a fully open position, may move it only to a partially open position. Apparatus which could compensate for the effects of hydraulic fluid expansion and contraction under rapid temperature changes, without appreciably affecting normal valve operation, would improve the valve performance.

OBJECTS AND SUMMARY OF THE INVENTION

An object of the present invention is to provide a hydraulically operated valve which operates efficiently in spite of rapid temperature changes.

Another object is to provide apparatus useful in a hydraulically actuated valve to compensate for temperature induced expansion and contraction of the hydraulic fluid.

In accordance with one embodiment of the present invention, a hydraulically actuated valve is provided which resists premature or late opening as the temperature of the environment increases or decreases. The valve includes a valve closing member that is moved away from and against a valve seat to control the flow of fuel or other fluid, a plunger for moving the valve closing member, and a hydraulic cylinder apparatus for moving the plunger. The hydraulic cylinder apparatus includes a large diameter piston that is moved a short distance by an actuator, the hydraulic fluid amplifying the motion to move the smaller diameter plunger a large distance. In order to compensate for thermal expansion and contraction of the hydraulic fluid, an elastically expandable chamber is provided which is coupled by a narrow passageway to the hydraulic cylinder, to receive fluid from it at a slow rate when the fluid expands. A check valve couples the expandable chamber to the hydraulic cylinder to return fluid thereto at a high rate. The narrow passageway may be formed by providing an appreciable clearance around the plunger so that hydraulic fluid leaks slowly thereby, and connecting a region around the plunger to the expandable chamber.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
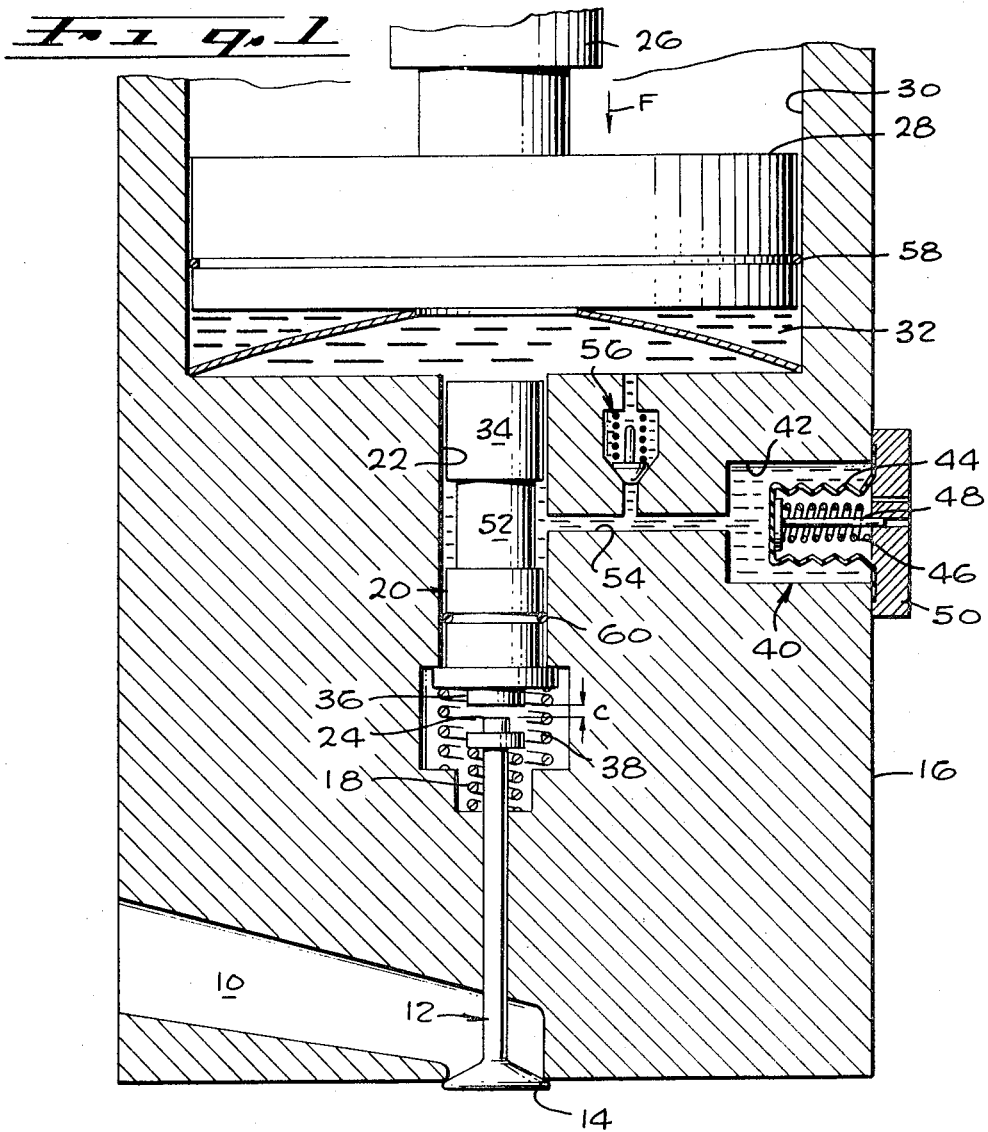
FIG. 1 is a partial sectional side view of a valve constructed in accordance with one embodiment of the present invention.

FIG. 1 illustrates a valve which controls the flow of air, exhaust or other controlled fluid through a passageway 10 by a valve closing member 12 that can move away from and against a valve seat 14. The valve closing member 12 is slidably mounted in a housing 16, and is urged by a spring 18 towards a closed position. Bearings and some other parts are eliminated in the Figure to facilitate its understanding. A plunger 20 that is slidably mounted in a plunger cylinder 22 formed in the housing, can move down against an outer end 24 of the valve closing member 12 to move it to an open position. Movement of the plunger 20 is controlled by an actuator 26 which moves a hydraulic piston 28 along a hydraulic cylinder 30. When the piston moves in a forward direction, as indicated by arrow F, it compresses hydraulic fluid 32 at one end of the cylinder to move the plunger 20 in a downward direction, and causes the plunger to move down the valve closing member 12 to open the valve.

The valve is constructed so that an actuator 26 can be employed which moves only a small distance while exerting a large force. Such an actuator may be a piezoelectric, magnostrictive, electromagnetic or even a mechanical cam type. Motion of the actuator is amplified by the piston 28 which compresses the hydraulic fluid 32 that bears against an upper plunger portion 34. The piston 28 has a much larger diameter than the upper plunger portion 34, so that a small movement of the piston 28 results in a much larger movement of the plunger. In order to prevent a slight opening of the valve when it should be closed, the valve is generally constructed with a small clearance C between the bottom end 36 of the plunger and the upper end 24 of the valve closing member 12. A spring 38 urges the plunger upwardly to maintain this clearance when the actuator has not moved forward, or downwardly, to open the valve.

The valve may be used in a situation wherein it undergoes rapid temperature changes, as where it is used to control the flow of air or fuel in an engine. Generally, the hydraulic fluid 32 expands considerably This than the volume in front of the piston 28 when the temperature increases. This can cause the fluid to push on the plunger 20 to reduce the clearance C between it and the valve closing member. The clearance C may be taken up entirely, and this can cause the valve to be left in a slightly open position when it should be closed. Conversely, a rapid drop in temperature of the valve generally results in a greater contraction of the volume of the hydraulic fluid 32 than the volume in the hydraulic cylinder in front of the piston 28. This can result in the valve not opening completely when the actuator 26 is operated.

In accordance with the present invention, the deleterious effects of temperature changes are largely eliminated by an elastic expansion chamber 40 which is coupled to the region of the fluid 32 in the hydraulic cylinder 30. The expansion chamber 40 can receive excessive hydraulic fluid from the hydraulic cylinder 30 when the temperature rises, and can discharge fluid back into the cylinder when the temperature decreases. The expansion chamber 40 is formed by a recess 42 in the valve housing and by a bellows 44 that is mounted in the recess. A spring 46 which extends around a guide rod 48 between one end of the bellows and a cap 50, urges the bellows to expand. The spring 46 urges the bellows to expand with a low force which is substantially constant throughout a large change in bellows length. Hydraulic fluid 32 in the cylinder 30 can enter the expansion chamber 40 by passing around the upper portion 34 of the plunger and into a space between a reduced diameter portion 52 of the plunger and the plunger cylinder 22. Fluid collected around the reduced diameter portion 52 is carried along a passage 54 in the housing to the expansion chamber 40. Hydraulic fluid can return to the hydraulic cylinder through a one-way or check valve 56 which allows fluid to flow in only one direction, this being a direction towards the cylinder 30.

An understanding of the manner in which the valve eliminates temperature effects can be gained by first considering the situation where the valve temperature rises at a time when the valve is not operating and is in the closed condition (i.e., the valve closing member 12 is closed on the seat 14). Prior to the temperature rise, the hydraulic fluid 32 in the hydraulic cylinder 30 and in the expansion chamber 40 is at the same pressure, which is somewhat above atmospheric pressure (the expansion chamber spring 46 determines the pressure, which may be about 100 p.s.i. in a typical installation). When the temperature rises and the hydraulic fluid 32 expands some of it leaks around the first plunger portion 34 into the collection area around the reduced diameter plunger portion 52 and into the expansion chamber 40. The bellows 44 compresses to accommodate the fluid. The flow of fluid into the expansion chamber is at a very low rate. If hydraulic fluid in the cylinder 30 decreases in temperature and contracts, the expansion chamber 40 tends to pump out fluid back into the hydraulic cylinder. Although a small return flow can be maintained around the plunger, a much larger flow occurs through the check valve 56. The large passageway through the check valve is desirable because hydraulic fluid is forced back to the hydraulic cylinder under a low pressure.

A temperature rise of the hydraulic fluid generally occurs while the valve is rapidly operating and the hydraulic fluid in the cylinder 30 repeatedly undergoes a large increase in pressure and a decrease back to its initial pressure. When the piston 28 is moving in the forward direction F, some fluid leaks around the upper plunger portion 34 into the expansion chamber 40. However, the flow is small and does not appreciably affect the distance which the plunger 20 moves. After a forward stroke, the piston 28 moves in reverse back to its original position. At this time, any fluid that has accumulated in the expansion chamber 40 returns through the check valve 56 to the hydraulic cylinder 30 to completely fill it. Any increase in valve temperature which increases the volume of hydraulic fluid in the cylinder 30 results in less fluid returning through the check valve 56 during reverse motion of the piston 28. Thus, for any temperature change, enough hydraulic fluid is held in the hydraulic cylinder 30 so that when the piston 28 is in its rearward or upward position, the hydraulic fluid therein is at a pressure only moderately above atmospheric pressure.

In order to resist leakage of hydraulic fluid, an elastomeric O-ring type sealing ring is mounted at 58 on the hydraulic piston 28 and at 60 on a lower plunger portion. The O-ring 60 on the lower plunger portion, which prevents the passage of hydraulic fluid to the valve closing member 12, actually must withstand only a moderate pressure, but the sealing must still be leak tight. The amount of hydraulic fluid pressure which the seals at 58 and 60 must seal against is limited in spite of temperature rises that may increase the volume of the hydraulic fluid, since the expansion chamber 40 bleeds off any excessive volume of fluid. Over a long period of usage, some hydraulic fluid may leak out. However, even a substantial amount of leakage can occur without changing the distance which the plunger 20 moves for a given stroke of the piston 28. This is because a considerably quantity of leaked hydraulic fluid can be supplied from the expansion chamber 40. Thus, the operating characteristics of the valve are maintained constant over a wide range of temperature changes and over a long period of time. If the guide rod 48 of the expansion chamber protruded out of the valve housing 16, it could serve as an indicator of when to add hydraulic fluid.

Figure 2:
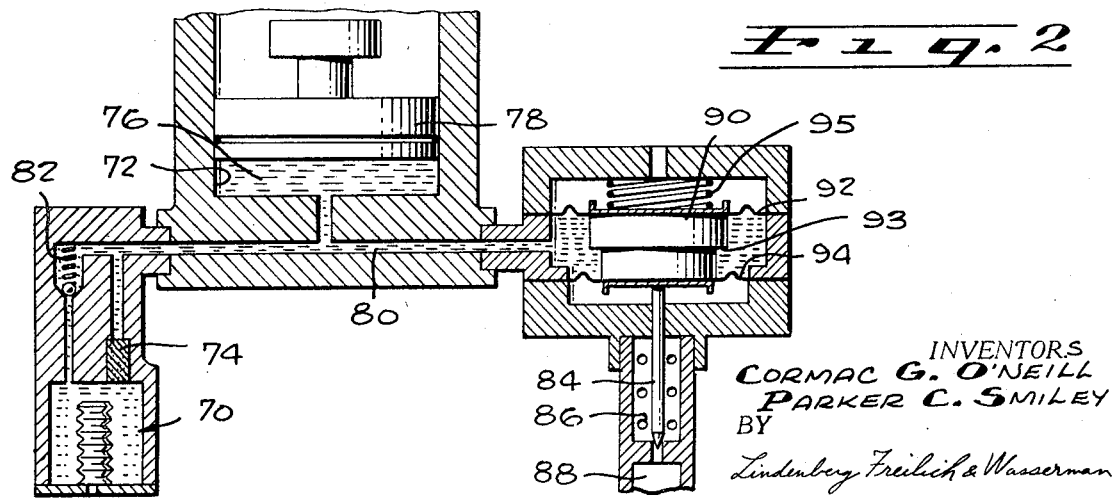
FIG. 2 is a partial sectional side view of a valve constructed in accordance with another embodiment of the invention.

FIG. 2 illustrates a valve constructed in accordance with another embodiment of the invention, wherein an expansion chamber 70 is coupled to a hydraulic cylinder 72 by a narrow passageway formed by the openings in a porous plug 74. In this embodiment of the invention, fluid 76 which is pumped by a hydraulic piston 78 can pass along a tube 80 through a porous plug 74 into the expansion chamber 70, and can return through a check valve 82 to the hydraulic cylinder. The plug 74 may be constructed of sintered bronze or other material that leaves pores that define a narrow passageway to allow only a small flow of fluid into the expansion chamber 70.

The valve of FIG. 2 includes a valve closing member 84 which controls the flow of fluid from openings 86 to an outlet 88. The valve closing member 84 is fastened to a plunger body 90 which is supported on two diaphragms 92 and 94. The region between the two diaphragms 92 and 94 is coupled through a tube to the hydraulic cylinder 72 to receive pressure pulses when the hydraulic piston 78 moves. The area of the upper diaphragm 92 and at the body ledge 93 is greater than the exposed area of the lower diaphragm 94, so that a pressure pulse in the region between the diaphragms causes the plunger body 90 to move upwardly and open the valve. Lowering of hydraulic pressure causes the valve to fall into a closed position, under the force of a closing spring 95.

During pressure pulses resulting from movement of the hydraulic piston 78, a all flow of hydraulic fluid occurs through the porous plug 74 into the expansion chamber 70. When the hydraulic piston 78 moves up, fluid flows from the expansion chamber 70 through the check valve 82 back into the hydraulic cylinder. Any expansion of the hydraulic fluid in the cylinder 72 results in the extra volume being taken up in the expansion chamber 70, so that the proper amount of hydraulic fluid is always maintained in the system.

Thus, the invention provides apparatus for use with a valve wherein the actuator is hydraulically coupled to a valve closing member, to absorb and replenish hydraulic fluid. The apparatus operates to maintain a proper amount of hydraulic fluid in the cylinder to produce a predetermined motion of a plunger or valve closing member for a predetermined movement of the actuator. The apparatus includes first means coupled to the hydraulic cylinder for receiving fluid therefrom at a low flow rate, and second means coupling the first means back to the hydraulic cylinder for passing fluid in a direction towards the hydraulic cylinder at a high flow rate. The apparatus also includes an expandable chamber for applying a low pressure that urges fluid back into the hydraulic cylinder. The means for carrying fluid at a low flow rate from the hydraulic cylinder can be formed by a small clearance between a plunger that is moved by the hydraulic fluid and the plunger cylinder. It can also be formed by a porous plug, walls forming a narrow orifice, or other similar devices. The means for carrying fluid back to the hydraulic cylinder can be any of a number of well known types of check valves that permit appreciable flow in only one direction. The valve assemblies can be used in a variety of applications, including automobile engines to control the flow of fuel, air or exhaust.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. In a valve assembly which includes a valve closing member movable to control flow through a passageway, a hydraulic cylinder for holding fluid, means for selectively pushing against said fluid to pressurize it, and means for coupling said fluid to said valve closing member to move it, the improvement comprising:
   first means coupled to said hydraulic cylinder for receiving fluid therefrom at a low flow rate; and
   second means coupling said first means back to said hydraulic cylinder for passing fluid substantially only in a direction towards said hydraulic cylinder at a high flow rate.

2. The improvement described in claim 1 including:
   means defining an elastically expandable chamber coupled to said first and second means.

3. The improvement described in claim 1 wherein:
   said first means includes a porous plug.

4. The improvement described in claim 1 wherein:
   said first means includes a plunger cylinder and a plunger slidably mounted in said plunger cylinder, a portion of the walls of said plunger and plunger cylinder having a clearance therebetween forming a narrow passageway.

5. A valve assembly comprising:
   means defining a first passageway and a valve seat along said passageway;
   a valve closing member mounted for movement against and away from said seat to close and open said passageway;

a hydraulic cylinder for holding fluid;

means for selectively compressing fluid in said cylinder;

plunger means mounted for moving towards said valve closing member under the pressure of said fluid, to move said valve closing member;

expansion chamber means for holding some of said fluid while maintaining pressure on it; and means defining a second passageway for coupling said cylinder to said expansion chamber means.

6. The valve assembly described in claim 5 wherein:

said plunger means has a first portion facing said fluid in said hydraulic cylinder which is constructed with a clearance that permits the flow of said fluid thereby, and a second portion spaced from said first portion for preventing the flow of fluid which leaks by said first portion from passing to said valve closing member; and said second passageway is coupled to said first portion of said plunger means to carry fluid which flows thereby to said expansion chamber means.

7. The valve assembly described in claim 5 including:

a return passageway coupling said expansion chamber means to said hydraulic cylinder; and a check valve disposed along said return passageway for allowing fluid to flow therethrough only in a direction towards said cylinder.

8. The valve assembly described in claim 5 wherein:

said expansion chamber means includes a bellows having one side exposed to said fluid, and spring means for urging said bellows to expel said fluid.

9. A valve assembly comprising:

means defining a passageway and a valve seat along said passageway;

a valve closing member mounted for movement against and away from said seat to close and open said passageway;

a hydraulic cylinder for holding fluid;

means for selectively compressing fluid in said cylinder;

slidably mounted plunger means for moving under the pressure of said fluid, said plunger means having a first portion for contacting said fluid to receive forces therefrom, a second portion for moving said valve closing member, and a middle portion for receiving fluid leaking past said first portion;

an expansion chamber coupled to said middle portion to receive fluid therefrom while maintaining pressure on said fluid; and a return valve for coupling said expansion chamber to said hydraulic cylinder.

10. The valve described in claim 9 wherein:

said means for selectively compressing fluid in said cylinder includes a piston slidably mounted in said hydraulic cylinder and an actuator for moving said piston, said piston having a sealing ring thereabout to form a tight seal with the walls of said cylinder;

said second portion of said plunger has a sealing ring thereabout to prevent the leakage of fluid thereby; and said plunger is constructed to provide a leakage of said fluid between said first and middle portions thereof at a rate many times greater than the rate of fluid leakage past said sealing ring on said piston and on said second portion of said plunger.

* * * * *